United States Patent
Wang

(10) Patent No.: US 12,020,143 B2
(45) Date of Patent: Jun. 25, 2024

(54) DIGITAL NEUROMORPHIC CODE PROCESSOR

(71) Applicant: FlashSilicon Incorporation, Diamond Bar, CA (US)

(72) Inventor: Lee Wang, Diamond Bar, CA (US)

(73) Assignee: FLASHSILICON INCORPORATION, Diamond Bar, CA (US)

( * ) Notice: Subject to any disclaimer, the term of this patent is extended or adjusted under 35 U.S.C. 154(b) by 1030 days.

(21) Appl. No.: 15/948,354

(22) Filed: Apr. 9, 2018

(65) Prior Publication Data

US 2019/0311255 A1    Oct. 10, 2019

(51) Int. Cl.
*G06N 3/065*      (2023.01)
*G06F 12/06*      (2006.01)
*G06N 3/08*       (2023.01)
*G06N 5/046*      (2023.01)

(52) U.S. Cl.
CPC .......... *G06N 3/065* (2023.01); *G06F 12/0646* (2013.01); *G06N 3/08* (2013.01); *G06N 5/046* (2013.01)

(58) Field of Classification Search
CPC .......... G06N 3/065; G06N 3/08; G06N 5/046; G06F 12/0646; G06F 12/0238; Y02D 10/00
See application file for complete search history.

(56) References Cited

U.S. PATENT DOCUMENTS

| | | | | |
|---|---|---|---|---|
| 5,893,929 A * | 4/1999 | Shadan | ............... | G06F 12/1027 711/205 |
| 8,879,323 B2 * | 11/2014 | Wang | ................. | G11C 16/0483 365/185.26 |
| 9,754,668 B1 | 9/2017 | Wang | | |
| 2016/0203868 A1 * | 7/2016 | Wang | ................... | G11C 15/046 365/49.17 |

FOREIGN PATENT DOCUMENTS

| | | | |
|---|---|---|---|
| JP | 2004252646 | * | 9/2004 |
| JP | 2004252646 A | * | 9/2004 |

OTHER PUBLICATIONS

Taha, Memristor Crossbar Based Multicore Neuromorphic Processors, 2014, 27th IEE International System-on-Chip Conference (SOCC) (Year: 2014) (Year: 2014).*

(Continued)

*Primary Examiner* — Aniss Chad
*Assistant Examiner* — Shien Ming Chou

(57) ABSTRACT

Inspired by the processing methods of biologic brains, we construct a network of multiple configurable non-volatile memory arrays connected with bus-lines as a neuromorphic code processor for code processing. In contrast to the Von-Neumann computing architectures applying the multiple computations for code vector manipulations, the neuromorphic code processor of the invention processes codes according to their configured codes stored in the non-volatile memory arrays. Similar to the brain processor, the neuromorphic code processor applies the one-step feed-forward processing in parallel resulting in a dramatic power reduction compared with the computational methods in the conventional computer processors.

15 Claims, 8 Drawing Sheets

(56) References Cited

OTHER PUBLICATIONS

Shafiee et al. ISAAC A Convolutional Neural Network Accelerator with In-Situ Analog Arithmetic in Crossbars, 2016 ACM/IEEE 43rd Annual International Symposium on Computer Architecture (Year: 2016) (Year: 2016).*

Plank, A Unified Hardware/Software Co-Design Framework for Neuromorphic Computing Devices and Applications, 2017 IEEE International Conference on Rebooting Computing ICRC, p. 1-8, Nov. 2017 (Year: 2017) (Year: 2017).*

Taha, Memristor Crossbar Based Multicore Neuromorphic Processors, 2014, 27th IEE International System-on-Chip Conference (SOCC) (Year: 2014).*

Meher, An Optimized Lookup-table for the Evaluation of Sigmoid Function for Artificial Neural Networks, 18th IEEE/IFIP International Conference on VLSI and System-on-Chip, 2010 (Year: 2010).*

Shafiee et al. ISAAC A Convolutional Neural Network Accelerator with In-Situ Analog Arithmetic in Crossbars, 2016 ACM/IEEE 43rd Annual International Symposium on Computer Architecture (Year: 2016).*

Plank, A Unified Hardware/Software Co-Design Framework for Neuromorphic Computing Devices and Applications, 2017 IEEE International Conference on Rebooting Computing ICRC, p. 1-8, Nov. 2017 (Year: 2017).*

Kandel et al., "The Constructive Nature of Visual Processing," Principles of Neural Science, $5^{th}$ Edition, Chapter 25, Published 1996, , pp. 556-561.

* cited by examiner

DIGITAL NEUROMORPHIC CODE PROCESSOR

BACKGROUND OF THE INVENTION

Field of the Invention

The invention is related to a code processor consisting of a network of multiple non-volatile memory arrays connected with bus-lines. In particular, the non-volatile memory arrays of multiple "Digital Perceptrons" process inputted content codes for the responsive codes (disclosed in U.S. Pat. No. 9,754,668B1, the disclosure of which is incorporated herein by reference in its entirety), and the non-volatile memory arrays of the Configurable Interconnection Matrixes (CIM, disclosed in U.S. Pat. No. 8,879,323B2, the disclosure of which is incorporated herein by reference in its entirety) connect bus-lines between multiple "Digital Perceptrons" to form a network of code processors. Similar to the firing and propagations of synaptic paths and loops in the neuromorphic structures of biologic brains, codes are parallel activated and propagated in the networks of the configured non-volatile memory arrays.

Description of the Related Art

In modern digital computations by computers, the binary data representing code symbols are fed into the logic gates in Central Processor Unit (CPU) for code manipulations. Particularly the so-called Von Neumann computing architecture shown in FIG. 1, the CPU 10 executes logic operations according to the instruction codes and data codes stored in its main memory 11. The CPU 10 includes a main memory 11, an arithmetic (special logic operations for code additions and multiplications) and logic unit 12, at least one input/output equipment 13 and a program control unit 14. The instruction codes and data codes are stored in the designated regions in the main memory 11 and accessed by memory address codes. Prior to the computation process, the CPU 10 is initially set by the program control unit 14 according to the initial instruction code in the main memory 11. The data code accessed by the address-code as well for data reading-out and storing-back in the main memory 11 are then processed with the arithmetic and logic unit 12 according to the sequential instruction codes in the main memory 11 to the program control unit 14. In general, the digital logic computation process for CPU 10 is to execute a set of pre-written sequential instruction codes and data codes stored in the main memory by a synchronous clock.

The power consumption for digital computations is given by $P \sim f \times C \times V_{DD}^2$, where f is the clock frequency, C is the total active circuit capacitance and $V_{DD}$ is the positive voltage supply for digital circuitries. Accordingly, the energy requirement for running a computation sequence is proportional to the numbers of clock steps to complete the set of instructions. Each instruction step includes fetching the instruction codes and data codes from the main memory 11, executing the micro-operations in the arithmetic and logic unit 12, and storing the computed data back to the main memory 11 or outputting to the I/O (Input/Output) equipment 13. The total computation energy for completing a set of instructions is proportional to the frequency of memory accessing and the charging/discharging the total capacitances of the bus-lines and the active digital circuitries (registers, logic gates, and multiplexers). The more frequent accessing memory to complete the computation processing steps, the more energy and processing time are consumed for the digital processors.

Unlike the Von Neumann computing systems operating multiple logic computations according to their pre-programmed instructions, the neural signals for information processing are activated and propagated layer-to-layer in the neuromorphic structures known as the one-step feed-forward processing. In terms of efficiency and energy consumption of information processing, the one-step feed-forward processing for neural signal patterns in the neuromorphic structures of biologic nerve systems consumes much less power than the methods of multiple computations as the generic operations in the Von Neumann computing systems. In real world, if the information processing by the biologic brains was applied with the multiple computations running at high clock frequencies between tens of MHz to tens of GHz, the biologic brains would have been fried by the power generated by the high frequency computations.

For biologic nerve systems of either simple or complex brains, the external stimuli such as lights, sounds, touches, tastes, and smells activate the receptive fields of sensory organs connected to the nerve system. The neural signals in the forms of electrical pulses and neural transmitters (molecules) generated in the receptor fields are propagated to trigger the neuron firing in the next connecting layer of the neural network in the nerve system. The field of neural signals generated from the connecting layer continues to process forward throughout the multiple layers of the neuromorphic structures in the nerve system. Each neural network layer excites certain neurons in the layer of the neuromorphic structures in response to the receiving field signals from their previous connecting layer. The neural signal paths in the neuromorphic structures are then created and propagated into the high levels of neural processing units. While in the high level of neural processing units, neurons form synaptic loops in neuron cell assemblies, where the synapses of neurons connect each other to form complex multiple feedback synaptic loops in neuron cell assemblies. Note that due to the logic natures of the synapses ("AND" for weak synapses/"OR" for strong synapses/ "NOT" for inhibit synapses) for firing a neuron (similar to a computer switching device), the synaptic loops of neuron cell assemblies are similar to the multiple input/output complex flip-flops (logic memory storage devices) in computer hardware. Specific synaptic loops known as the neural volatile working memory generated by temporary neural signals and non-volatile long-term memory created by hardwired synapses in neuron cell assemblies are activated by the receiving neural field signals from their previous connecting layer.

To illustrate the brain mind process, we show a visual process in FIG. 2 (FIG. 25-4, p. 560, "Principle of Neural Science" by Eric Kandel et. al.) and the correspondent interpretations in FIG. 3. As shown in FIGS. 2 and 3, the receptive sensor signals are decomposed and analyzed by firing neural pattern signals in the front layers of neuromorphic structures to trigger the synaptic loop signal firing in the higher level of functional cortexes of the neuromorphic brain structures. Basically, the principle of information processing for biologic neural network systems is the firing and propagating the neural signal patterns (synaptic paths and loops) in the neuromorphic structures of the biologic brains.

Inspired by the parallel field information processing of neural networks, we have disclosed a code processor component, the so-called "Digital Perceptron" (disclosed in U.S.

Pat. No. 9,754,668 B1), analogous to the information processing in neural network systems, where the "Digital Perceptron" consists of two main non-volatile memory arrays configured with content codes and responsive (perceptive) codes, respectively. When the signals of an inputted content code from the input bus-lines are broadcasted into the non-volatile content memory array for a code match, the signals of matched responsive code from the non-volatile perceptive memory array of the "Digital Perceptron" are then generated onto the output bus-lines. The output code signals can be further applied for executing a set of sequential computing codes, activating a code sequence to drive the attached analog devices, or propagating to next stage of "Digital Perceptrons" as the inputted content code signals.

For the main aspect of this invention, without running multiple computations at the high clock frequencies as the conventional Von Neumann computing systems, we have applied the multiple "Digital Perceptrons" and multiple Configurable Interconnection Matrixes (CIM) with bus-lines connected in-between to construct the code processors, where codes are activated and transmitted in the configured non-volatile code processor, similar to the biological brain processors, where the neural signals are activated and transmitted in the neuromorphic structures.

Another aspect of this invention is that the way of the information processing by the configured codes stored in the non-volatile memories of the code processor is similar to that of the information processing by the synaptic configurations in grown neuromorphic structures of the biologic brain processors.

Another aspect of this invention is that the code processors consisting of multiple-time configurable non-volatile memory arrays can be reconfigured (updated) with new content and responsive codes according to the results of new algorithms or new functionalities similar to the biological brains growing new synapses in the neuromorphic structures from learning and training.

Another aspect of this invention is that the outputted responsive codes of "Digital Perceptrons" in response to the inputted content codes can be applied for activating a pre-programmed automatic code sequence to drive analog devices, similar to the autonomous responses in biologic brain processors.

Another aspect of this invention is that multiple-layer combined output codes generated by multi-layer combined output buffers from multiple processing layers of code processors (Digital Perceptrons) can be interpreted as a meaningful object similar to the cognitive process in biologic brain processors.

SUMMARY OF THE INVENTION

To fulfill the above described functions of neuromorphic code processor, we have applied an input buffer 421, an output buffer 430, multiple "Digital Perceptrons" (DPs) 401, multiple Configurable Interconnection Matrixes (CIMs) 402, and multiple bus-lines 403, 404, 405, 406 to form a neuromorphic code processor 400 for a "(y+1)-function" by "(z+1)-layer" neuromorphic code processor shown in FIG. 4. The main portion of the neuromorphic code processor 400 is divided into "z+1" processing layers 410. Each processing layer consists of multiple DPs 401 for code processing, and multiple CIMs 402 for the connections to other processing layers and the output buffer 430. The first processing layer "0" consists of "y+1" DPs and "y+1" CIMs for "y+1" functional code inputs. The number of DPs and CIMs contained in each processing layer corresponds to the number of functionalities individually provided and defined by each processing layer. As shown in FIG. 4, for a "(y+1)-code-function" by "(z+1)-layer" neuromorphic code processor 400, the input buffer 420 includes (y+1) code buffers 422 that respectively store (y+1) input function codes for "y+1" functions. The (y+1) input function code signals are activated to be generated from the (y+1) code buffers 422 through the connected bus-lines 403 to the first processing layer "0" of DPs 401 by applying the enabling signal at the node IE 421. The output buffer 430 includes a plurality of single-layer output buffers 433 and a plurality of multiple-layer combined output buffers 435. The single-layer output codes from the DPs of each single processing layer are stored in the single-layer output buffers 433 and the multiple-layer combined output codes from the DPs of multiple layers are stored in the multiple-layer combined output buffers 435, respectively. The output codes from the neuromorphic code processor 400 are activated to be stored in the output buffers 430 by applying the enable signal at the OE node 431.

The neuromorphic code process 400 operates as the following: when the "y+1" input functional codes are already stored in the "y+1" code buffers 422, the enabling signal at the node IE 421 activates the "y+1" input functional code signals onto the bus-lines 403 connected to the first processing layer "0" of the code processor 400. The first processing layer "0" of the code processor 400 processes the "y+1" input functional codes according to the configured content and responsive (perceptive) codes in the DPs 401 of the first processing layer "0". The responsive (perceptive) code signals are generated onto the output bus-lines 404 connected to the first processing layer "0" of CIMs 402, each of which is configured to pass the responsive code signals onto the bus-lines 403 connected to the sequential processing layers of the code processor 400 and onto the bus-lines (405, 406) connected to the first single-layer output buffer 433, respectively. The responsive code signals continue to activate and propagate throughout the multi-layers of configured DPs 401 and CIMs 402 to the last processing layer "z" of the code processor 400 as the one-step feed-forward processing. When the code processor 400 has reached a steady state, the enabling signal at the node OE 431 activates a switch (not shown) to write the single-layer output codes and the multiple-layer combined output codes from the connected bus-lines 405 to the single-layer output buffers 433 and the multiple-layer combined output buffers 435, respectively. The output codes stored in the output buffer 430 can be then applied for executing a set of sequential computations or activating code sequences to drive analog devices. From the conventional computation point of view for the code vector manipulation, DPs 401 in each processing layer convert the input code vectors with content meanings into the post-computational code vectors.

It is noted that the applications of the single-layer output codes to other operations such as activating pre-programmed computational sequences or activating pre-programmed code sequences for driving analog devices can be considered as the autonomous operations, while the applications of multi-layer combined output codes for other operations requiring code recognitions from multiple processing layers can be considered as the cognitive operations.

BRIEF DESCRIPTION OF THE DRAWINGS

For a better understanding of the present invention and to show how it may be carried into effect, reference will now be made to the following drawings, which show the preferred embodiment of the present invention, in which.

DETAILED DESCRIPTION OF THE INVENTION

The following detailed description is meant to be illustrative only and not limiting. It is to be understood that other embodiment may be utilized and element changes may be made without departing from the scope of the present invention. Also, it is to be understood that the phraseology and terminology used herein are for the purpose of description and should not be regarded as limiting. Those of ordinary skill in the art will immediately realize that the embodiments of the present invention described herein in the context of methods and schematics are illustrative only and are not intended to be in any way limiting. Other embodiments of the present invention will readily suggest themselves to such skilled persons having the benefits of this disclosure.

Figure 1:
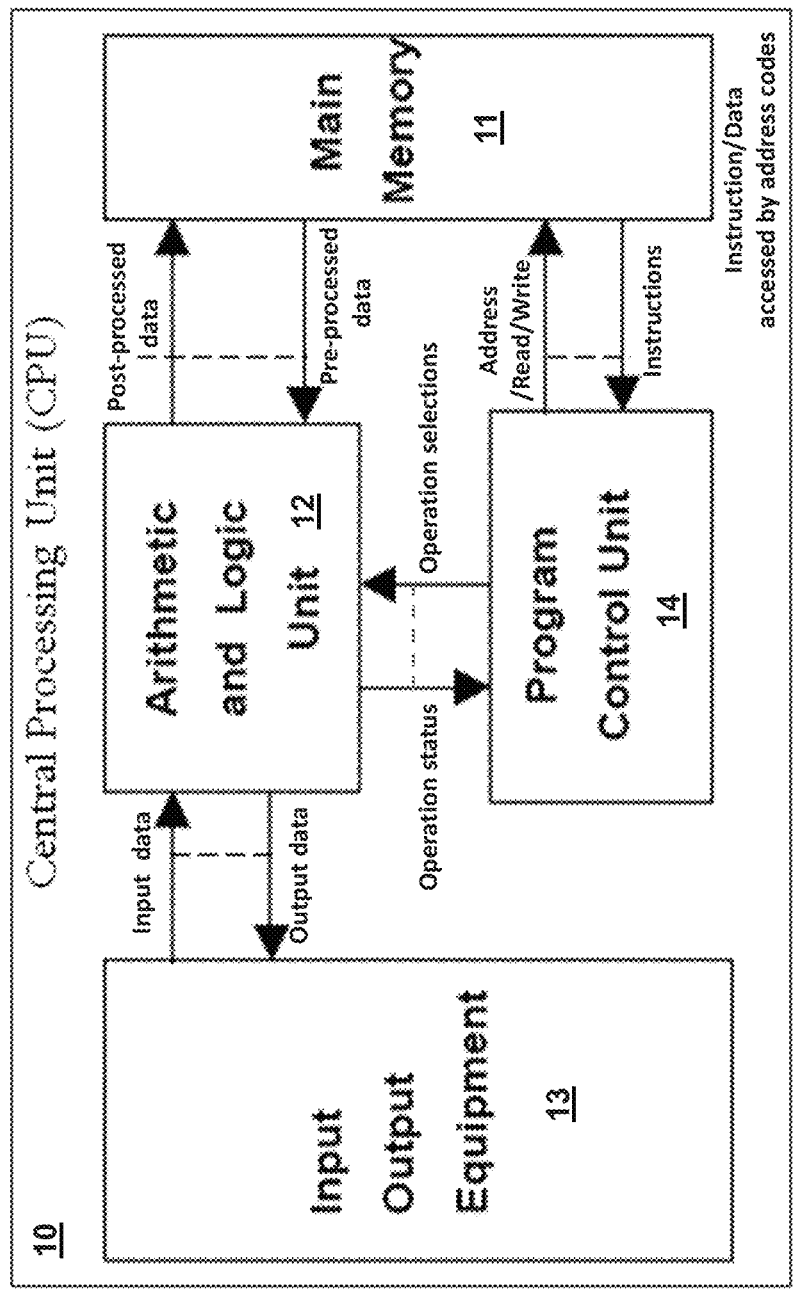
FIG. 1 shows a conventional Von-Neumann computing architecture for a typical Central Processing Unit (CPU).
Figure 2:
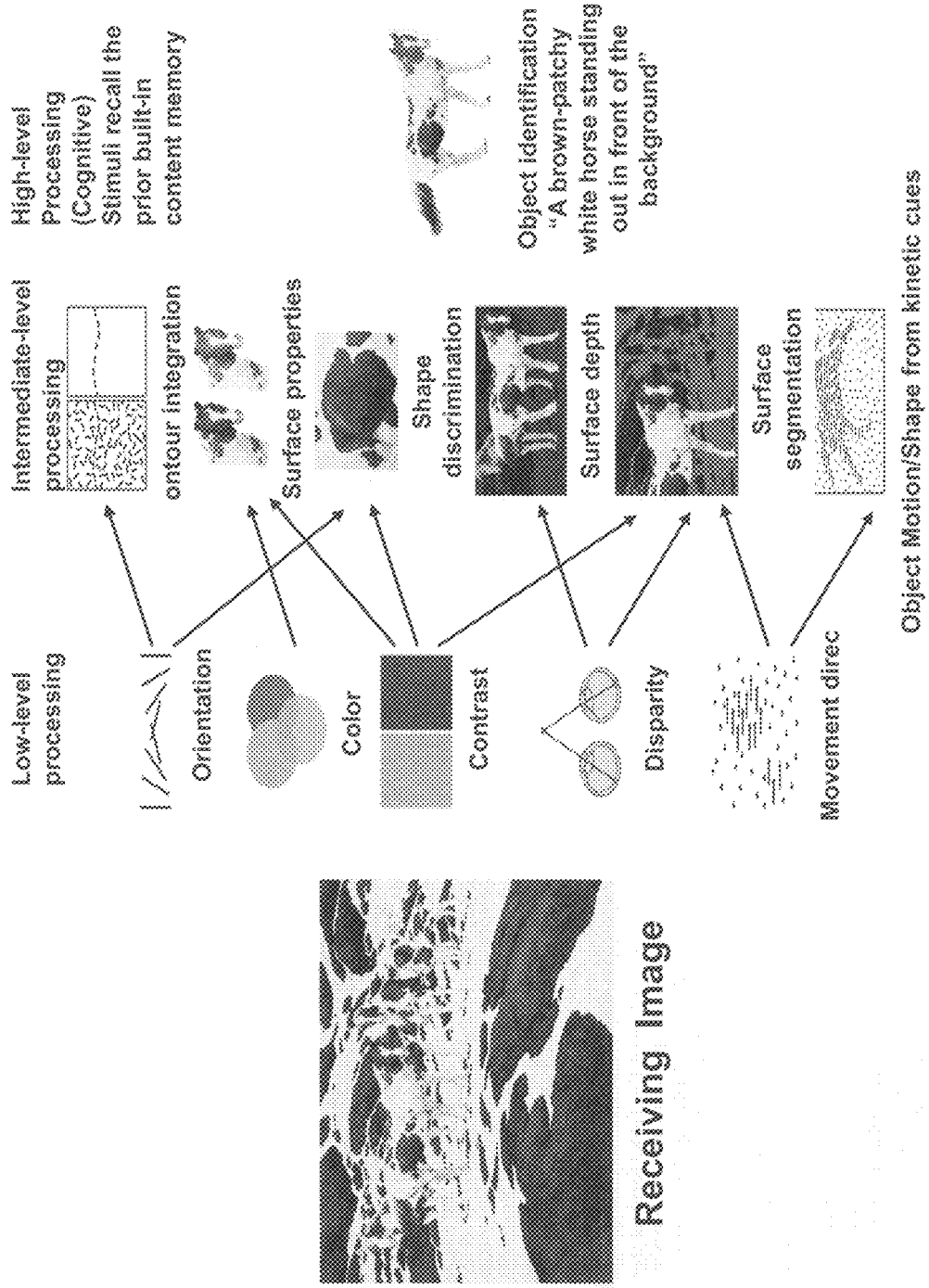
FIG. 2 illustrates an exemplary process of visual perception according to the prior art.
Figure 3:
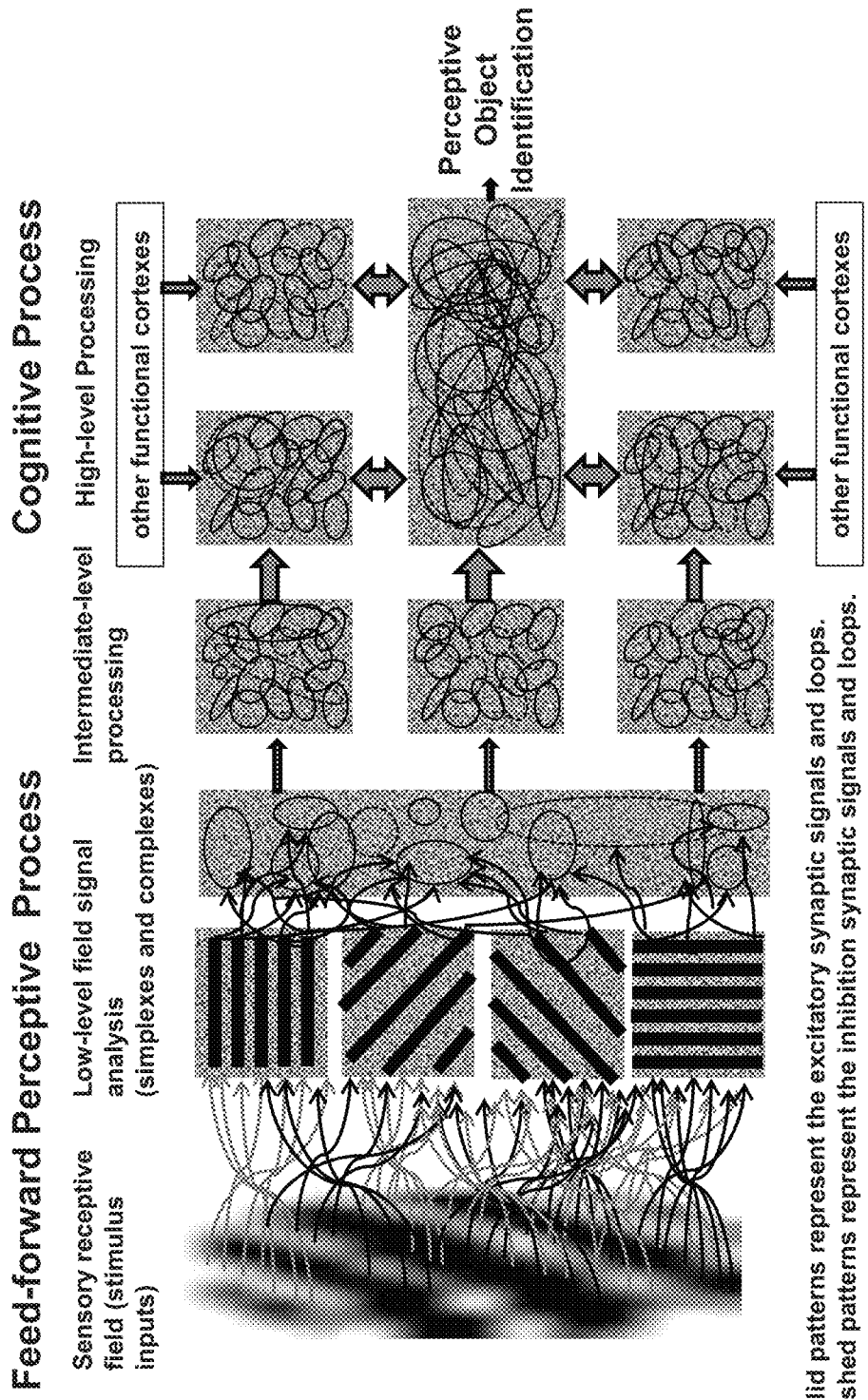
FIG. 3 provides the pictorial interpretation of visual perception shown in FIG. 2.
Figure 4:
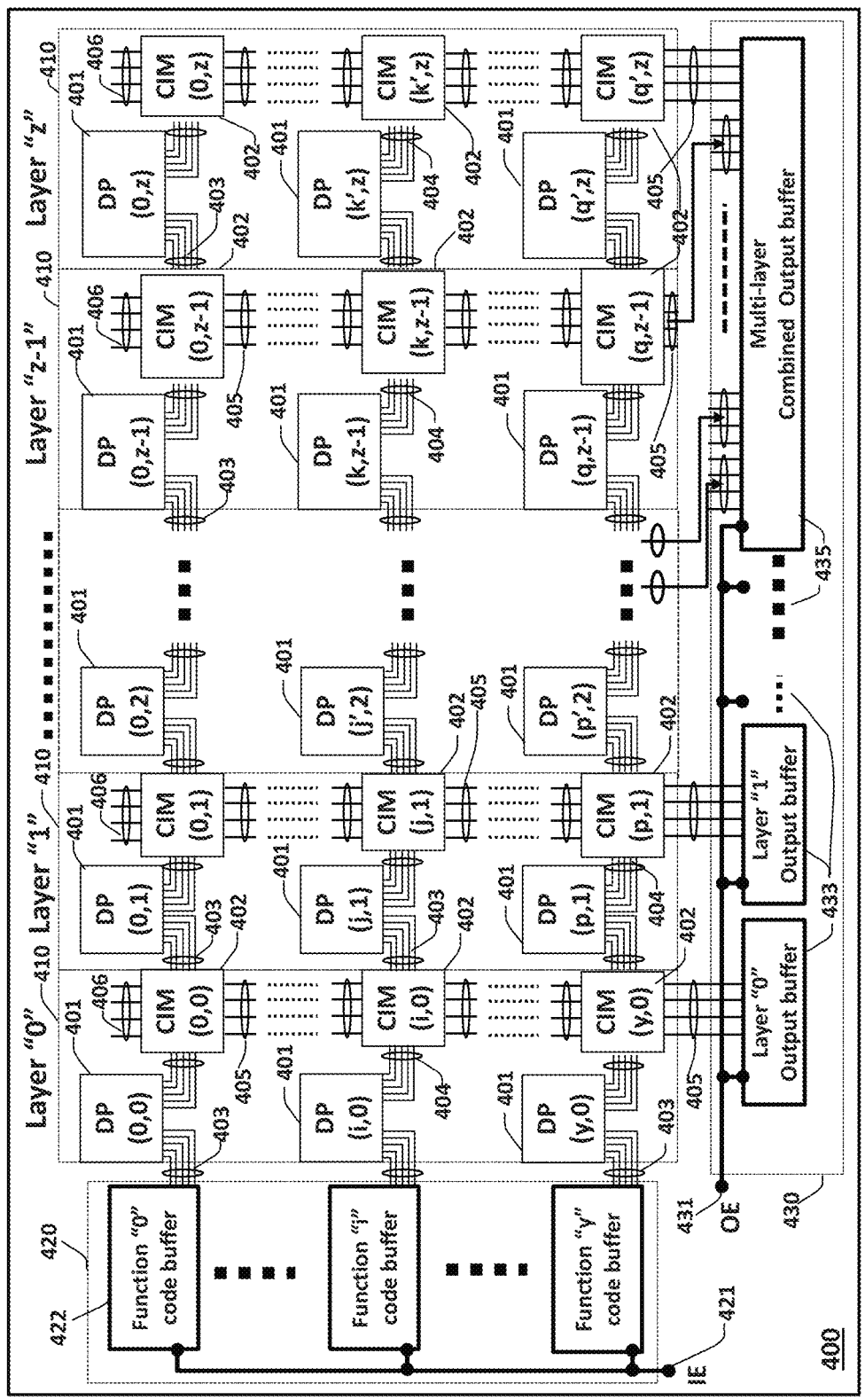
FIG. 4 shows the schematic of a neuromorphic code processor according to this invention.
Figure 5:
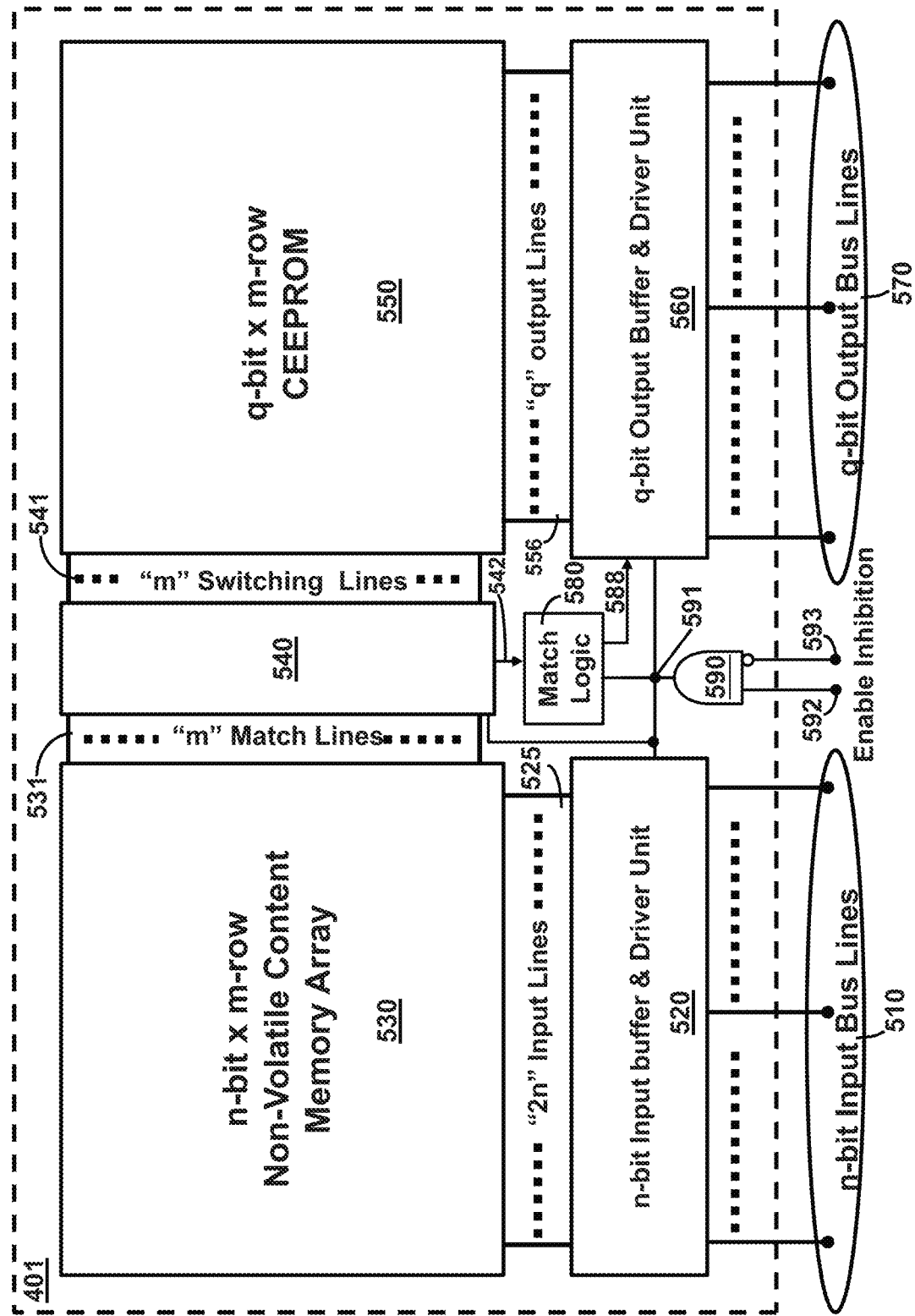
FIG. 5 shows the schematic of "Digital Perceptron" (DP) with "n-bit" content length, "m-scenarios" of content depth, and "q-bit" perception width.

In the embodiment, the schematic of "Digital Perceptron" ("DP") 401 is shown in FIG. 5 (disclosed in U.S. Pat. No. 9,754,668B1). The DP 401 is configured with "n-bit" input content length and "q-bit" output perceptive (responsive) width. Please be noted that the variables n and q are varied according to each DP 401 in FIG. 4. In the DP 401, an n-bit by m-row non-volatile content memory array 530 through "2n" input lines 525 is connected to an n-bit input buffer and driver unit 520 with the connection of external n-bit input bus lines 510. When the "enabled high" signal at node 591 is activated by $V_{DD}$, the input buffer and driver unit 520 receives the digital symbol (content) signals from the external n-bit input bus lines 520 and broadcasts the n-bit digital signals into the n-bit by m-row non-volatile content memory array 530. The "m" rows of the match-lines 531 in the non-volatile content memory array 530 attach to a match detector 540 connected to the correspondent m-row word-lines of the q-bit×m-row CEEPROM array 550 by the "m" switching lines 541. When the m-row match detector 540 is activated by the "enabled high" $V_{DD}$ signal at node 591, the "matching" signal from one of the m match detector cells in the match detector 540 can switch on the correspondent wordline in the q-bit×m-row CEEPROM array 550. The q-bit output signals by the "q" output lines 556 are then sent to the q-bit output buffer and driver unit 560. Meanwhile the "matching" signal from one of the m match detector cells in the match detector 540 is also fed into the match logic circuitry 580 to generate the "send high" $V_{DD}$ signal at the node 588 for connecting the q-bit output buffer and driver unit 560 with the external q-bit output bus lines 570 to send out the q-bit output signals (the q-bit perceptive/responsive code). On the other hand, if the n-bit input data does not match any row of the configured non-volatile data in the non-volatile content memory array 530, the output buffer and driver unit 560 are not connected to the external output bus lines 570. The DP 401 then sends out no digital signals of the perceptive/responsive code to the external output bus lines 570. This function is to imitate the information processing by biological nerve systems in response to the irrelevant information inputs from the environments.

The "inhibition" function can be commonly observed for the neural networks in biologic nerve systems. One classic example is the knee jerk case, where the combination of excitatory and inhibitory synaptic connections mediating the stretch reflex of the quadriceps muscles. To imitate this function, we apply a simple "AND" gate 590 having two input nodes, an "Enable" node 592 and an "Inhibition" node 593, for turning on and off the DP 401. The DP 401 is turned on by the "enabled high" $V_{DD}$ signal at the node 591, if and only if for the "high" $V_{DD}$ signal at the "Enable" node 592 and the "low" $V_{SS}$ signal at the "Inhibition" node 593.

Figure 6:
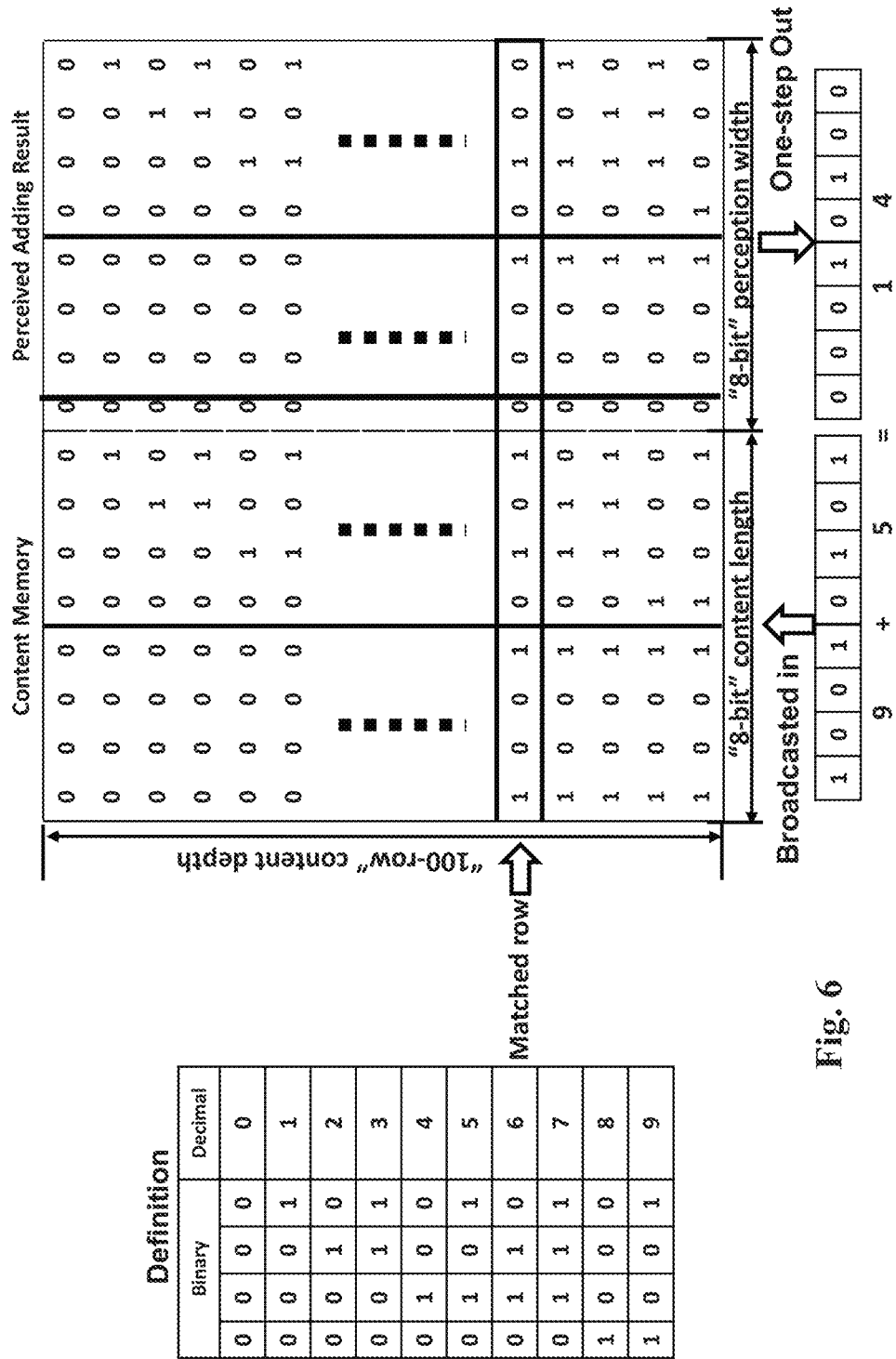
FIG. 6 shows the configured code table for a two single-digit decimal adder perceptron.

The "m-row" in both the content memory array 530 and the Complementary Electrical Erasable Programmable Read Only Memory (CEEPROM) array 550 are representing for the "m" content scenarios. For example, a two single-digit decimal adder perceptron is illustrated in FIG. 6. The single decimal digit is defined by 4 digital binaries as shown in the left table in FIG. 6. In the content memory array 530, the two single-digit decimal numbers are represented by 2×4=8 digit binaries. The input content length can be defined as "8-bit". Since there are 10 decimal numbers (0, 1, . . . , 9) for each decimal digit, it would have 10×10=100 scenarios for the two single-digit decimal adder. The input content depth of the decimal adder perceptron would require 100 rows in the content memory array 530 for the 100 correspondent scenarios. The results of the addition for the two single-digit decimal adder are the numbers of 0d00, 0d01, 0d02, 0d03, . . . , and 0d18, which are represented by two decimal digits. In terms of the binary digits, the two decimal digits are represented with 2×4=8 bits for the "8-bit" perceptive width. For the example of 9+5=14, the decimal digits 9 (0b1001) and 5 (0b0101) are inputted into the adder perceptron and the matched row will output the result of 1 (0b0001) and 4 (0b0100) as illustrated in the right table in FIG. 6. It is also noted that the numbers of content length/depth and perceptive width of a digital perceptron for a specific function can be varied according to the various definitions of codes and codes generated from various algorithms. From the silicon hardware cost perspective, the optimized digital perceptron for a specific function is to obtain the minimum numbers of content length/depth and perceptive width. Take the decimal adder perceptron for example. If we can apply the commutation property of addition, i.e., A+B=B+A, where A and B are two decimal numbers, the content depth of the perceptron can be reduced from 100 rows to 55 rows in the content memory array 530.

Figure 7:
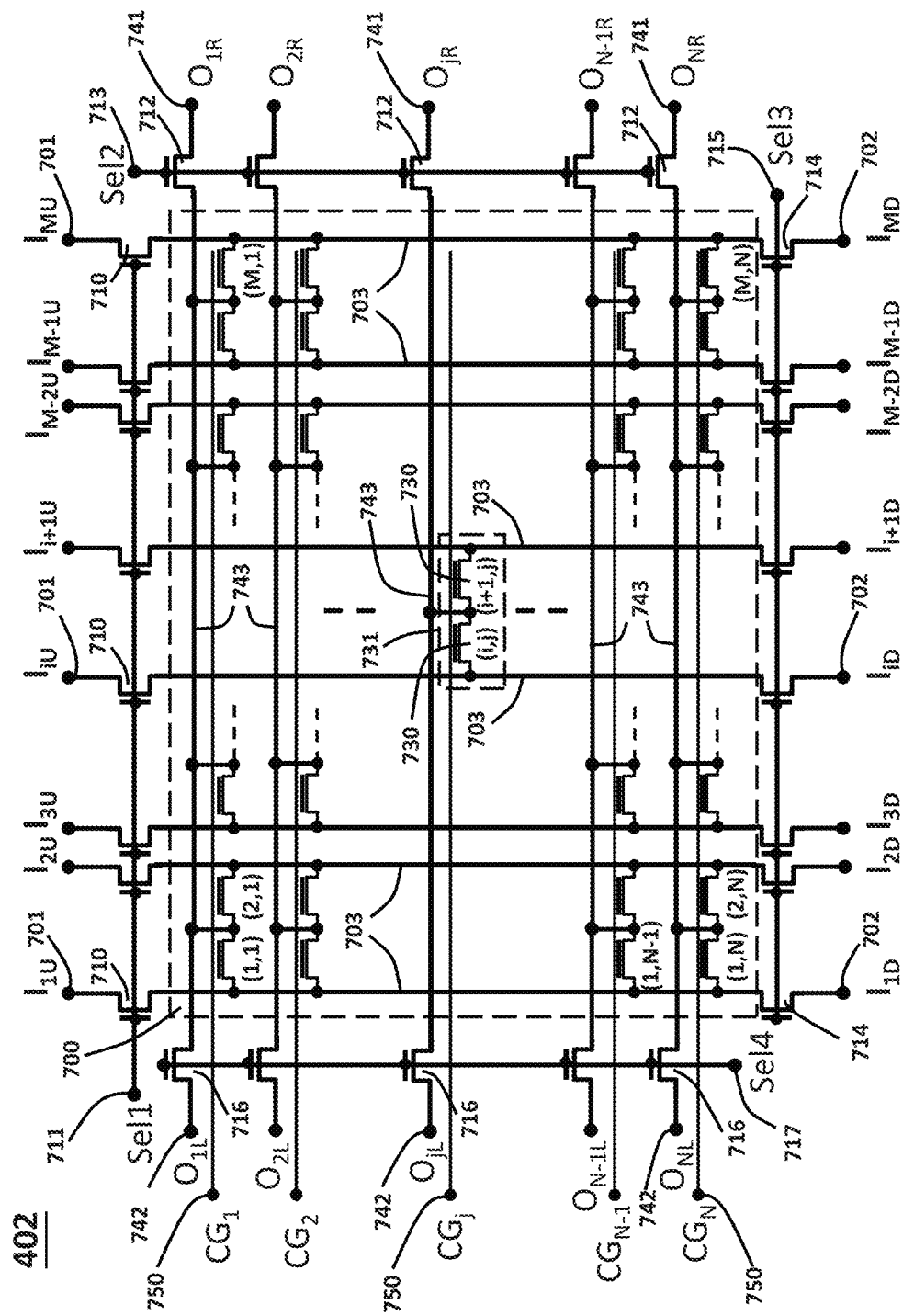
FIG. 7 shows the schematic of an M×N Configurable Interconnection Matrix (CIM).

FIG. 7 (disclosed in U.S. Pat. No. 8,879,323B2) shows the Configurable Interconnection Matrix (CIM) 402. The schematic of configurable interconnection matrix 402 consisting of an M×N NVM array 700 and selection MOSFET switches (710, 712, 714, and 716) are shown in FIG. 7. In the M×N NVM array 700, where the NVM cells 730 are paired with one shared common source electrode and two separate drain electrodes as illustrated in unit 731 in the middle of FIG. 7, a row of control gates 750 of NVM cells 730 forms the control gate line CGj for j=1 ... N; a column of drain electrodes of NVM cells 730 are connected to form the i-bitline 703 for i=1 ... M, a row of common source electrodes of NVM cells 730 are connected to form the j-common source line 743 for j=1 ... N. The input terminals 701 and 702, denoted by $I_{iU}$ and $I_{iD}$ for i=1 ... M, are connected to M bitlines 703 in the M×N NVM array through MOSFET switches 710 and 714, respectively. The right/left output terminals 741 and 742, denoted by $O_{jR}$ and $O_{jL}$ for j=1 ... N, are connected to N common source lines 743 in the M×N NVM array through MOSFET switches 712 and 716, respectively. Please be noted that the variables M and N are individually defined by each CIM 402 in FIG. 4.

By applying a voltage signal, $V_{set} > (V_{DD} + V_{th})$, to the gate terminals (711, 713, 715, and 717) of the selection switches (710, 712, 714, and 716) in FIG. 7, where $V_{th}$ is the selection switch threshold voltage, a network of the interconnection matrix 402 able to pass signals less than $V_{DD}$ is formed. To disconnect the interconnection matrix 402 from the external data bus lines, the voltage signals at the gate terminals (711, 713, 715, and 717) of the selection switches (710, 712, 714, and 716) are set to ground. Applied with a control gate voltage bias lower than the high threshold voltage and higher than the low threshold voltage, a NVM cell (i, j) 730 with the programmed high threshold voltage is "off" to disconnect a bit line i from a common source line j. If another NVM cell (i, j) 730 has the low threshold voltage and is applied with the same control gate bias, the NVM cell (i, j) 730 is "on" to connect the bit line i with the common source line j for 1<i<M and 1<j<N.

Figure 8:
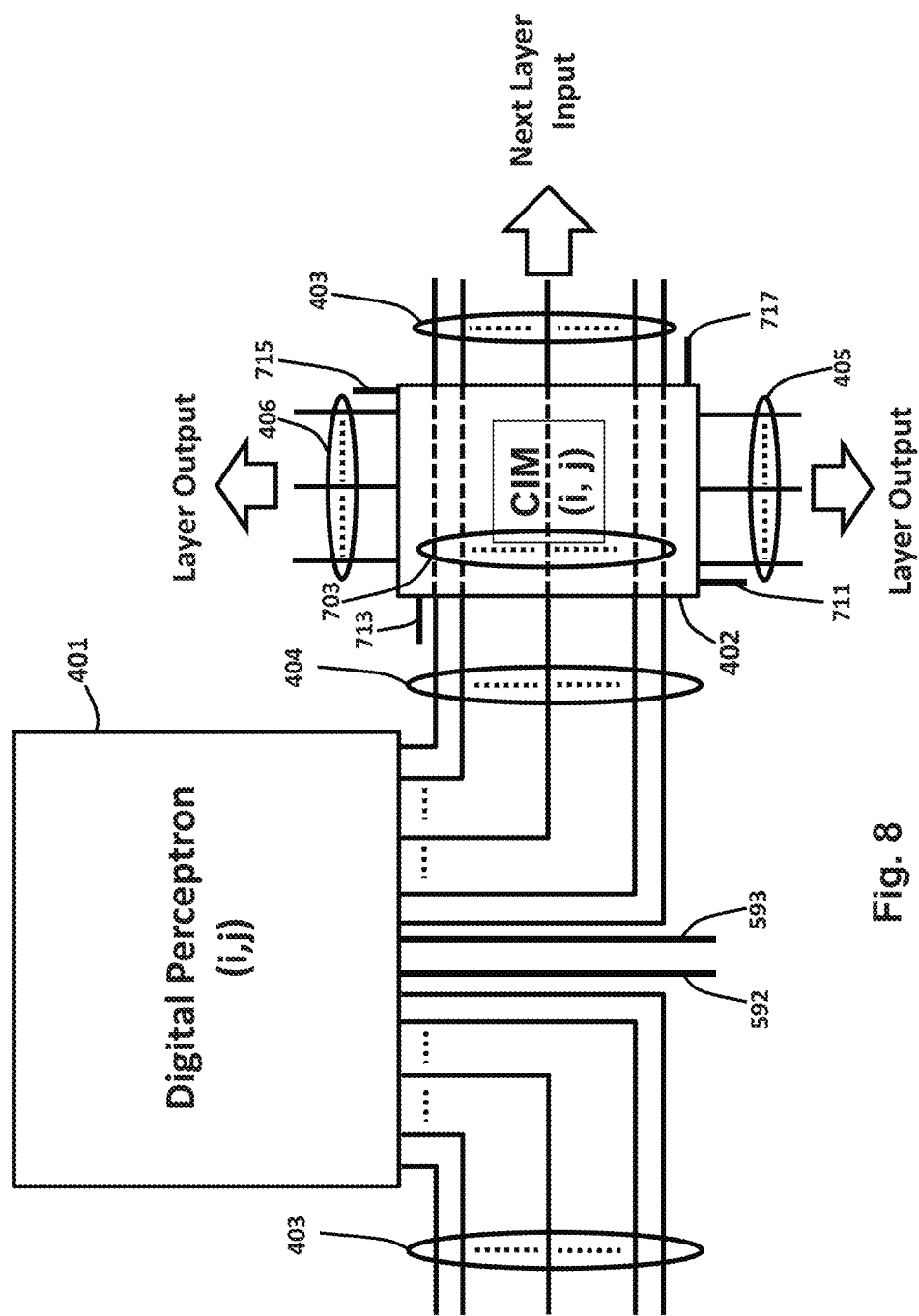
FIG. 8 shows the connections between the n-input/q-output DP and the "q-input/q-output and p bi-directional output" CIM for the "i-function and j-layer" component unit (i,j) in FIG. 4 according to an embodiment of this invention.

FIG. 8 shows the bus-line connections between an n-input/q-output DP 401 and a q×p CIM 402 for the i-function and j-layer processing cell (i, j) in FIG. 4, for 0<=i<=y and 0<=j<=z. The n-bus lines 403 are connected to the n-input nodes of the DP 401. The q-output nodes of the DP 401 are connected to the q-input nodes of CIM 402 through a number "q" of bus-lines 404. As shown in FIG. 7 (as rotated 90° counter-clock-wise in FIG. 8), the q-input nodes of CIM ($I_{1U}$, $I_{2U}$, ..., $I_{qU}$) connect the q-output nodes ($I_{1D}$, $I_{2D}$, ..., $I_{qD}$) through the q-bitlines 703 (see FIG. 7). Therefore, the digital signals from the DP 401 of one processing layer can propagate along the bitlines 703 in the CIM 402 of the same processing layer and the bus-lines 403 of its next processing layer toward the DP 401 of the next processing layer. While the right/left "p" output nodes (741 and 742 in FIG. 7) of the CIM 402 are connected to the bus-lines 406 and 405 for the layer outputs (the vertical direction in FIG. 8). Meanwhile the "Enable" node 592 and "Inhibition" node 593 of the DP 401 are the control signal nodes for activating or deactivating the DP 401 in the code processing. The control signal nodes 711 and 715 in the CIM 402 are applied with the control voltage signals to connect/disconnect the bus-lines 404 to the CIM 402 and the CIM 402 to the bus-lines 403 connected to the DP 401 of its next processing layer, respectively. The control voltages are also applied to the control signal nodes 717 and 713 for connecting/disconnecting the vertical bus-lines 406 and 405 to the output buffer 430.

The aforementioned description of the preferred embodiments of the invention has been presented for purposes of illustration and description. It is not intended to be exhaustive or to limit the invention to the precise form or to exemplary embodiments disclosed. Accordingly, the description should be regarded as illustrative rather than restrictive. Obviously, many modifications and variations of non-volatile memory elements including the types of non-volatile memory devices such as the conventional MOSFET devices with floating gate, charge trap dielectrics, or nanocrystals for charge storage material, and the non-volatile memory devices having the "conducting" and "non-conducting" states to form a complementary pair such as Phase Change Memory (PCM), Programmable Metallization Cell (PMC), Magneto-Resistive Random Memories (MRAM), Resistive Random Access Memory (RRAM), and Nano-Random Access Memory (NRAM) will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A digital code processor comprising:
    an output buffer; and
    a plurality of processing layers connected in series, each processing layer comprising a number X of processing cells operating in parallel, each processing cell comprising a first non-volatile memory array pre-configured with a plurality of content codes and a second non-volatile memory array pre-configured with a plurality of responsive codes, wherein the number X of processing cells in each processing layer are configured to (1) receive a number X of input codes, (2) compare the number X of input codes with their content codes respectively pre-configured in a number X of first non-volatile memory arrays in parallel, (3) generate a number X of responsive codes or less, (4) selectively propagate the number X of responsive codes or less to its next processing layer and (5) selectively write the number X of responsive codes or less to the output buffer, wherein steps (1) through (5) are performed in a processing layer order starting from a first processing layer and proceeding successively to each next processing layer until a last processing layer is reached, where X is the number of functionalities individually provided and defined by each processing layer, and wherein for multiple electrically series-connected processing cells in the same row, an input code of a first processing cell in a current processing layer is always equal to a responsive code outputted from a second processing cell in a previous layer.

2. The digital code processor according to claim 1, wherein each processing cell comprises:
    a digital perceptron device for receiving one of the number X of input codes, comparing the one of the number X of input codes with its content codes pre-configured in its first non-volatile memory array and generating zero or one of its responsive codes pre-configured in its second non-volatile memory array according to the comparing result; and a configurable interconnection matrix (CIM) for selectively receiving the zero or one of its responsive codes, selectively propagating the zero or one of its responsive codes to its next processing layer and selectively outputting the zero or one of its responsive codes to the output buffer.

3. The digital code processor according to claim 2, wherein each processing cell further comprises:

a first bus and a second bus, wherein the digital perceptron device is connected between the first bus and the second bus, wherein the digital perceptron device receives the one of the number X of input codes from the first bus and outputs the zero or one of its responsive codes to the second bus; and a third bus connected to the output buffer;

wherein the CIM is connected among the first bus of its next processing layer, the second bus and the third bus.

4. The digital code processor according to claim 3, wherein the output buffer comprises:

a plurality of single-layer output buffers, each of which is connected to the third buses of one processing layer and stores the number X of responsive codes or less as a plurality of single-layer output codes; and a plurality of multi-layer combined output buffers, each of which is connected to the third buses of multiple processing layers and stores a plurality of responsive codes from the third buses of the multiple processing layers as a plurality of multi-layer combined output codes.

5. The digital code processor according to claim 4, wherein the single-layer output codes and the multi-layer combined output codes are applied for executing pre-programmed computational sequences or activating pre-programmed code sequences to drive analog devices.

6. The digital code processor according to claim 5, wherein the multi-layer combined output codes represent multiple contents according to the outputs of the predefined functions and the following sequences to be applied.

7. The digital code processor according to claim 1, further comprising:

an input buffer for storing and supplying the number X of input codes to the first processing layer of the series-connected processing layers.

8. The digital code processor according to claim 1, wherein the content codes in the first non-volatile memory array and the responsive codes in the second non-volatile memory array for each processing cell are capable of being re-configured according to results of new algorithms or new functionalities.

9. A method for operating a digital code processor comprising a plurality of processing layers connected in series, each processing layer comprising a number X of processing cells operating in parallel, each processing cell comprising a first non-volatile memory array pre-configured with a plurality of content codes and a second non-volatile memory array pre-configured with a plurality of responsive codes, the method comprising:

(1) receiving a number X of input codes by the number X of processing cells in one processing layer;

(2) comparing the number X of input codes with their content codes respectively pre-configured in a number X of first non-volatile memory arrays in parallel by the number X of first non-volatile memory arrays in the number X of processing cells in the one processing layer;

(3) obtaining a number X of responsive codes or less by a number X of second non-volatile memory arrays in the number X of processing cells in the one processing layer;

(4) selectively propagating the number X of responsive codes or less to its next processing layer by the number X of processing cells in the one processing layer;

(5) selectively outputting the number X of responsive codes or less by the number X of processing cells in the one processing layer; and (6) repeating steps (1) through (5) in a processing layer order starting from a first processing layer and proceeding successively to each next processing layer until a last processing layer is reached, where X is the number of functionalities individually provided and defined by each processing layer, and wherein for multiple electrically series-connected processing cells in the same row, an input code of a first processing cell in a current processing layer is always equal to a responsive code outputted from a second processing cell in a previous layer.

10. The method according to claim 9, wherein the step (5) further comprises:

selectively outputting the number X of responsive codes or less as a plurality of single-layer output codes to a single-layer output buffer for storage by the X processing cells in the one processing layer.

11. The method according to claim 10, further comprising:

applying the single-layer output codes for executing pre-programmed computational sequences or activating pre-programmed code sequences to drive analog devices.

12. The method according to claim 9, wherein the step (5) further comprises:

selectively outputting a plurality of responsive codes as a plurality of multi-layer combined output codes to a multiple-layer output buffer for storage by the one processing layer together with another at least one processing layer.

13. The method according to claim 12, further comprising:

applying the multi-layer combined output codes for executing pre-programmed computational sequences or activating pre-programmed code sequences to drive analog devices.

14. The method according to claim 13, wherein the multi-layer combined output codes represent multiple contents according to the outputs of the predefined functions and the following sequences to be applied.

15. The method according to claim 9, wherein the content codes in the first non-volatile memory array and the responsive codes in the second non-volatile memory array for each processing cell are capable of being re-configured according to results of new algorithms or new functionalities.

* * * * *